US008317653B2

(12) United States Patent
Nogi

(10) Patent No.: US 8,317,653 B2

(45) Date of Patent: Nov. 27, 2012

(54) ENGINE UNIT AND STRADDLE-TYPE VEHICLE

(75) Inventor: Sadao Nogi, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 1135 days.

(21) Appl. No.: 12/193,942

(22) Filed: Aug. 19, 2008

(65) Prior Publication Data

US 2009/0054204 A1 Feb. 26, 2009

(30) Foreign Application Priority Data

Aug. 20, 2007 (JP) ................................ 2007-214109

Jul. 22, 2008 (JP) ................................ 2008-188750

(51) Int. Cl.

*B60W 10/04* (2006.01)

(52) U.S. Cl. ........................................... 477/37; 477/44

(58) Field of Classification Search .................... 477/44, 477/37; 180/65.285, 230, 346, 377; 474/8–29, 474/93

See application file for complete search history.

(56) References Cited

U.S. PATENT DOCUMENTS

| | | | | |
|---|---|---|---|---|
| 4,881,925 | A * | 11/1989 | Hattori | 474/18 |
| 6,656,069 | B2 * | 12/2003 | Sugano | 474/28 |
| 6,938,676 | B2 * | 9/2005 | Lan et al. | 165/41 |
| 7,225,892 | B1 * | 6/2007 | Berthiaume | 180/230 |
| 7,686,123 | B2 * | 3/2010 | Ishida | 180/346 |
| 2002/0170383 | A1 * | 11/2002 | Fujikawa et al. | 74/606 R |

FOREIGN PATENT DOCUMENTS

| | | | |
|---|---|---|---|
| EP | 1170475 | A2 * | 9/2002 |
| JP | 2002-019669 | | 1/2002 |

* cited by examiner

*Primary Examiner* — Michael Mansen

*Assistant Examiner* — Robert T Reese

(74) *Attorney, Agent, or Firm* — Keating & Bennett, LLP

(57) ABSTRACT

A continuously variable transmission of an engine unit. A driving side pulley is mounted on a crankshaft. A driven side pulley is mounted on a driven shaft. A belt is looped around the driving and driven side pulleys. The continuously variable transmission is housed in a transmission case. The transmission case includes a drive shaft supporting portion supporting an end portion of the crankshaft, a driven shaft supporting portion supporting an end portion of the driven shaft 27, and a support column portion bridged between the drive shaft supporting portion and the driven shaft supporting portion. The engine unit thereby has a simple structure and increaes the strength of supporting a crankshaft and a driven shaft.

13 Claims, 13 Drawing Sheets

ENGINE UNIT AND STRADDLE-TYPE VEHICLE

RELATED APPLICATIONS

This application claims the benefit of priority under 35 USC 119 of Japanese patent application no. 2007-214109, filed on Aug. 20, 2007, and Japanese patent application no. 2008-188750, filed on Jul. 22, 2008, which are hereby incorporated by reference.

BACKGROUND OF THE INVENTION

1. Field of the Invention

The present invention relates to an engine unit for outputting drive force in a straddle-type vehicle.

2. Description of Related Art

The engine unit of a straddle-type vehicle (for example, a motorcycle) may include a belt-type continuously variable transmission. A belt-type continuously variable transmission is generally provided with a driving side pulley mounted on a drive shaft, a driven side pulley mounted on a driven shaft and a belt that is looped around the driving and driven side pulleys and that transmits drive force to the driven side pulley from the driving side pulley.

In an engine unit provided with a belt-type continuously variable transmission, Japanese Unexamined Patent Publication No. 2002-19669 proposes supporting the end portion of the drive shaft and the end portion of the driven shaft with a case for housing the continuously variable transmission.

However, when the belt is tightly looped so as not to cause a transmission loss of drive force between the driving and driven side pulleys, force in a direction to bring the drive shaft close to the driven shaft is applied to the drive and driven shafts by the belt, which raises the possibility that the drive and driven shafts will be slightly deflected. To prevent such deflection, the rigidity of the whole of the case for supporting these shafts is increased, which raises the possibility that the productivity of the engine unit will be decreased.

SUMMARY OF THE INVENTION

The present invention addresses this problem and provides an engine unit with a simple structure that increases the strength of supporting drive and driven shafts.

An engine unit according to the present invention includes a drive shaft and a driven shaft arranged separately from the drive shaft. A continuously variable transmission has a driving side pulley mounted on the drive shaft. A driven side pulley is mounted on the driven shaft, and a belt is looped around the driving and driven side pulleys. A case housing the continuously variable transmission includes a drive shaft supporting portion for supporting an end portion of the drive shaft, a driven shaft supporting portion for supporting an end portion of the driven shaft, and a support column portion bridged between the drive shaft supporting portion and the driven shaft supporting portion.

A straddle-type vehicle according to the present invention includes the above-mentioned engine unit.

According to the present invention, the case for supporting the drive and driven shafts has a support column part, so that the strength of supporting the drive and driven shafts is increased by a simple structure and deflection of the shafts is prevented.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
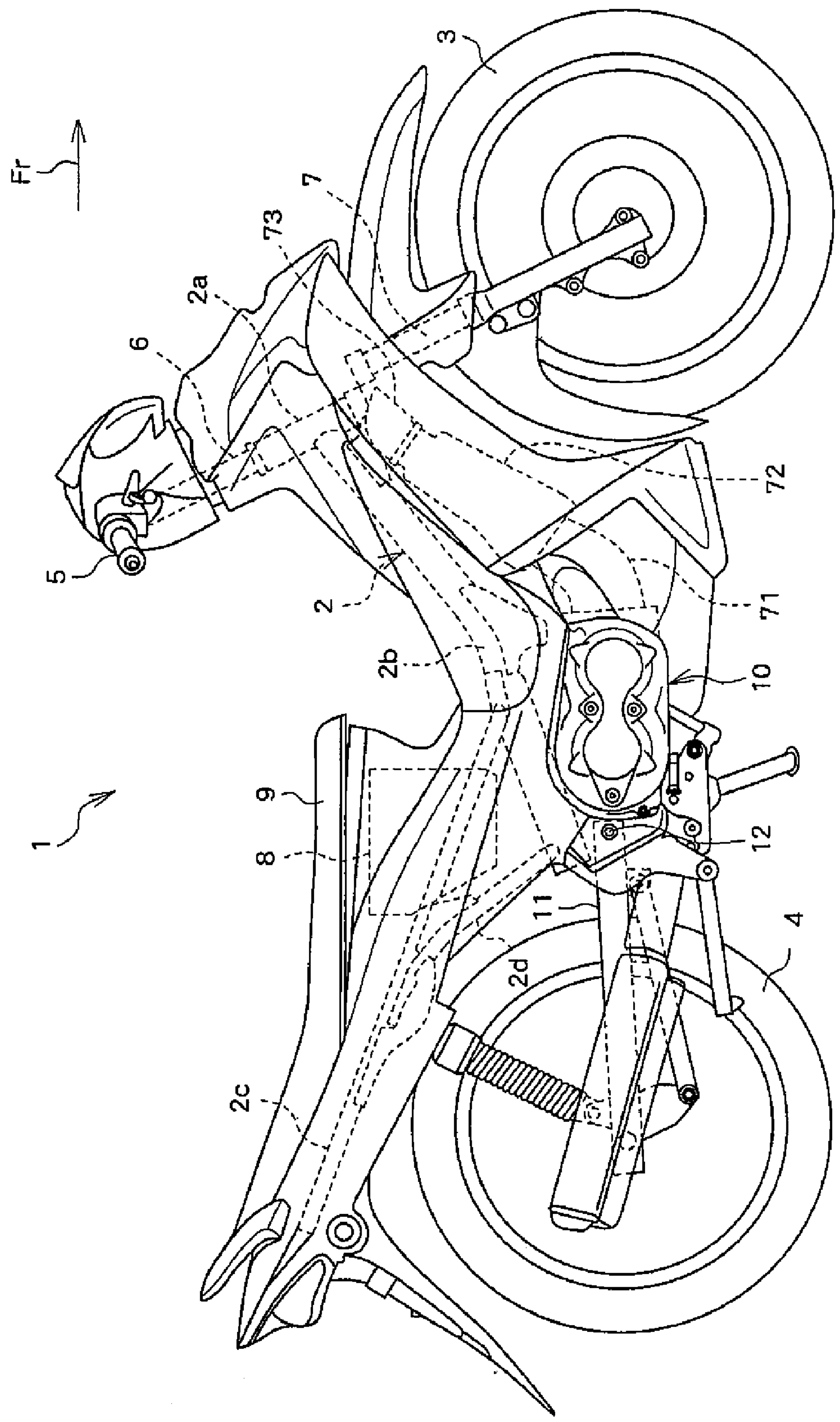
FIG. 1 is a side view of a motorcycle mounted with an engine unit of an embodiment of the present invention.
Figure 2:
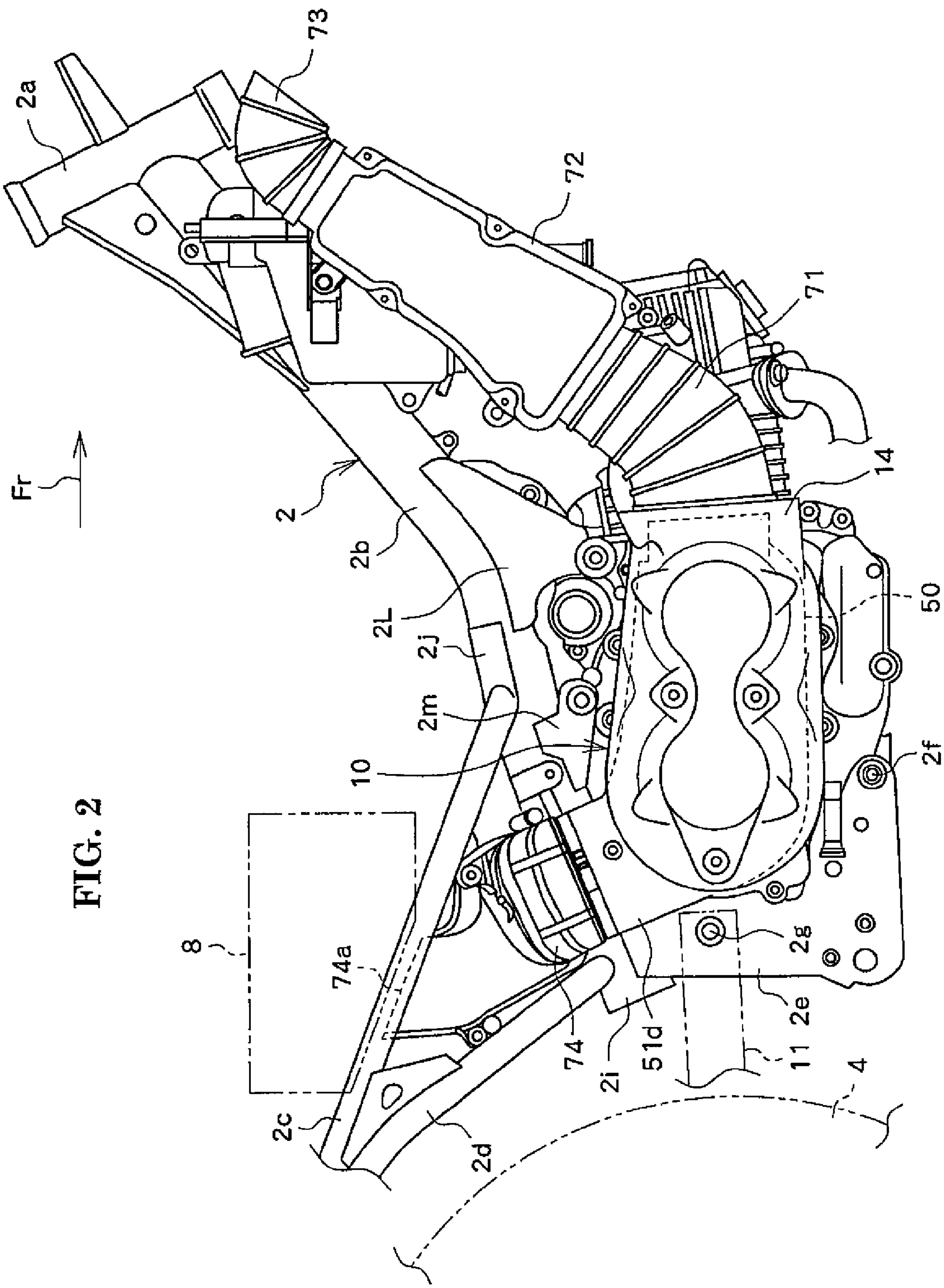
FIG. 2 is a side view of the engine unit and a vehicle body frame.
Figure 3:
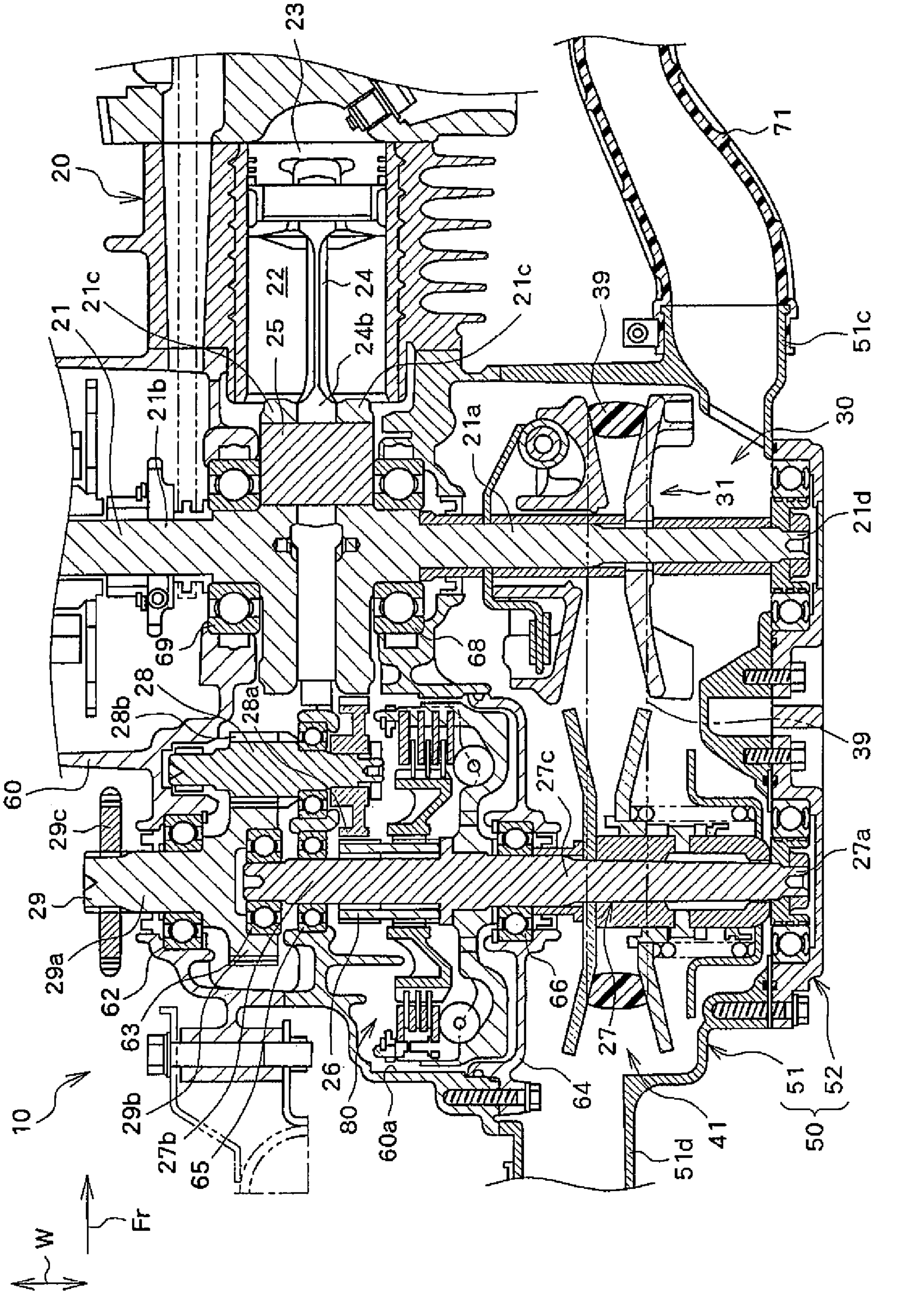
FIG. 3 is a sectional view of the engine unit.

An embodiment of the present invention is now described with reference to the drawings. FIG. 1 is a side view of a motorcycle 1 mounted with an engine unit 10 according to an embodiment of the present invention, A straddle-type vehicle of the present invention may be a motorcycle (including a scooter), a four-wheel buggy and a snowmobile. FIG. 2 is a side view of engine unit 10. FIG. 3 is a sectional view of engine unit 10. Engine unit 10 and vehicle body frame 2 are shown in FIG. 2.

As shown in FIGS. 1 and 2, motorcycle 1 includes engine unit 10 and vehicle body frame 2. As shown in FIG. 2, vehicle body frame 2 includes a steering head 2*a*, a main frame 2*b*, a seat rail 2*c*, a stay 2*d* and a bracket 2*e*. As shown in FIG. 1, steering head 2*a* is disposed on the front end portion of vehicle body frame 2 and rotatably supports a steering shaft 6 rotating with a handlebar 5. A front fork 7 is connected to the bottom end portion of steering shaft 6, and the bottom end portion of front fork 7 supports a front wheel 3.

As shown in FIG. 2, the front end portion of main frame 2*b* is connected to steering head 2*a*. Main frame 2*b* slants downward toward the rear portion of a vehicle body from its front end portion, and its rear (bottom) end portion 2*i* is positioned in front of a rear wheel 4. Front end portion 2*j* of seat rail 2*c* is connected to a middle portion of main frame 2*b*. Seat rail slants upward toward the rear portion of the vehicle body from its front end portion 25. A storage case 8 and a seat 9 are arranged above seat rail 2*c*, and seat rail 2*c* supports these parts (see FIG. 1). The front end portion of stay 2*d* is connected to rear end portion 2*i* of main frame 2*b*, and stay 2*d* slants upward from its front end portion and has its top end portion connected to a middle portion of seat rail 2*c* (FIG. 1).

As shown in FIG. 2, bracket 2*e* extends downward and is formed in the shape of a plate. A top edge portion of bracket 2*e* is joined to rear end portion 2*i* of main frame 2*b*. A support part 2*g* supporting a pivot shaft 12 is fixed to an upper portion of bracket 2*e* (FIG. 2). As shown in FIG. 1, a front end portion of a rear arm 11 is fixed to pivot shaft 12. Rear arm 11 extends rearward (in a direction opposite to direction Fr of FIG. 1), and its rear end portion supports the axle of rear wheel 4. Rear arm 11 swings on pivot shaft 12 as a pivot along with rear wheel 4 upward and downward and swings independently of engine unit 10.

As shown in FIG. 2, bracket 2*e* has a portion 2*f*, to which engine unit 10 is fixed, on the front side of its bottom end portion. Moreover, brackets 2L, 2*m* protruding downward are joined to a middle portion of main frame 2*b*. The top wall on the front side of a crankcase 60 of engine unit 10 is fixed to bracket 2L, the top wall on the rear side of crankcase 60 is fixed to bracket 2*m*, and the lower portion of crankcase 60 is fixed to portion 2*f* of bracket 2*e*. Engine unit 10 is thereby supported by vehicle body frame 2.

As shown in FIG. 2, engine unit 10 is arranged below the rear portion of main frame 2*b* and in front of rear wheel 4. As shown in FIG. 3, engine unit 10 includes an engine 20, a continuously variable transmission 30, a clutch 80, crankcase 60 and a transmission case 50 housing continuously variable transmission 30. Engine unit 10 further includes an air intake duct 71 for sending outside air into transmission case 50, and an air exhaust duct 74 for exhausting air from transmission case 50 (FIG. 2). Moreover, engine unit 10 includes a cover 14 for covering transmission case 50 from the side. Cover 14 is omitted in FIG. 3.

As shown in FIG. 3, engine 20 includes a crankshaft 21, a cylinder 22 and a piston 23. Cylinder 22 is arranged in a front position (in a direction shown by Fr in FIG. 3) relative to crankcase 60 while being slightly slanted. When an air-fuel mixture of fuel and air sent into cylinder 22 from an air intake port combusts, piston 23 reciprocates in cylinder 22. Piston 23 is coupled to a crankpin 25 disposed in crankshaft 21 via a connecting rod 24. Reciprocating motion of piston 23 is converted to rotational motion by crankshaft 21 and is outputted to the downstream side of the transmission path of drive force.

Crankshaft 21 extends in the vehicle width direction (in direction W in FIG. 3) in crankcase 60. Crankshaft 21 includes a right shaft part 21*a*, a left shaft part 21*b*, and a pair of crank arms 21*c*, 21*c*. Crank arms 21*c*, 21*c* extend in a radial direction (direction perpendicular to the center line of the shaft) from the base portions of right shaft part 21*a* and left shaft part 21*b* and support crankpin 25 rotatably.

The base portion of left shaft part 21*b* is supported by crankcase 60 via a bearing 69. Left shaft part 21*b* extends outward in the vehicle width direction from its base portion. Left shaft part 21*b* has a generator mounted thereon.

The base portion of right shaft part 21*a* is supported by crankcase 60 via a bearing 68. Right shaft part 21*a* extends outward in the vehicle width direction from its base portion and has a driving side pulley 31 of continuously variable transmission 30 mounted thereon. End portion 21*d* of right shaft part 21*a* is supported by transmission case 50, which is described in detail later.

Engine unit 10 includes a driven shaft 27 and an output shaft 29 arranged on the center line of driven shaft 27 at a position rearward of and separate from crankshaft 21. Driven shaft 27 extends in the vehicle width direction. A driven side pulley 41 of continuously variable transmission 30 and a clutch 80 are mounted on driven shaft 27. Driven side pulley 41 is arranged rearward of driving side pulley 31, and clutch 80 is arranged inside in the vehicle width direction of driven side pulley 41.

End portion 27*a* outside in the vehicle width direction (right side) of driven shaft 27 is supported by transmission case 50, which is described in detail later.

End portion 27*b* inside in the vehicle width direction left side) of driven shaft 27 has a bearing 65 and a bearing 63 fitted thereon. Bearing 63 is arranged outside of (on the end portion side of) bearing 65. The outer race of bearing 65 is supported by crankcase 60. Crankcase 60 supports end portion 27*b* of driven shaft 27 via bearing 65. Output shaft 29 is fitted on the outer race of bearing 63, and bearing 63 supports output shaft 29. Central portion 29*a* of output shaft 29 is supported by crankcase 60 via a bearing 62.

A bearing 66 is fitted on central portion 27*c* of driven shaft 27. The outer race of bearing 66 is supported by a partition member 64 fixed to crankcase 60, and crankcase 60 supports the central portion of driven shaft 27 via partition member 64 and bearing 66. Partition member 64 is positioned between clutch 80 and driven side pulley 41 and closes a clutch chamber 60*a* in crankcase 60. Clutch 80 is arranged in clutch chamber 60*a*.

Continuously variable transmission 30 is a belt-type continuously variable transmission and, as described above, includes driving side pulley 31 and driven side pulley 41. Moreover, continuously variable transmission 30 has a belt 39 that is looped around driving side pulley 31 and driven side pulley 41 and transmits torque from driving side pulley 31 to driven side pulley 41.

Figure 4:
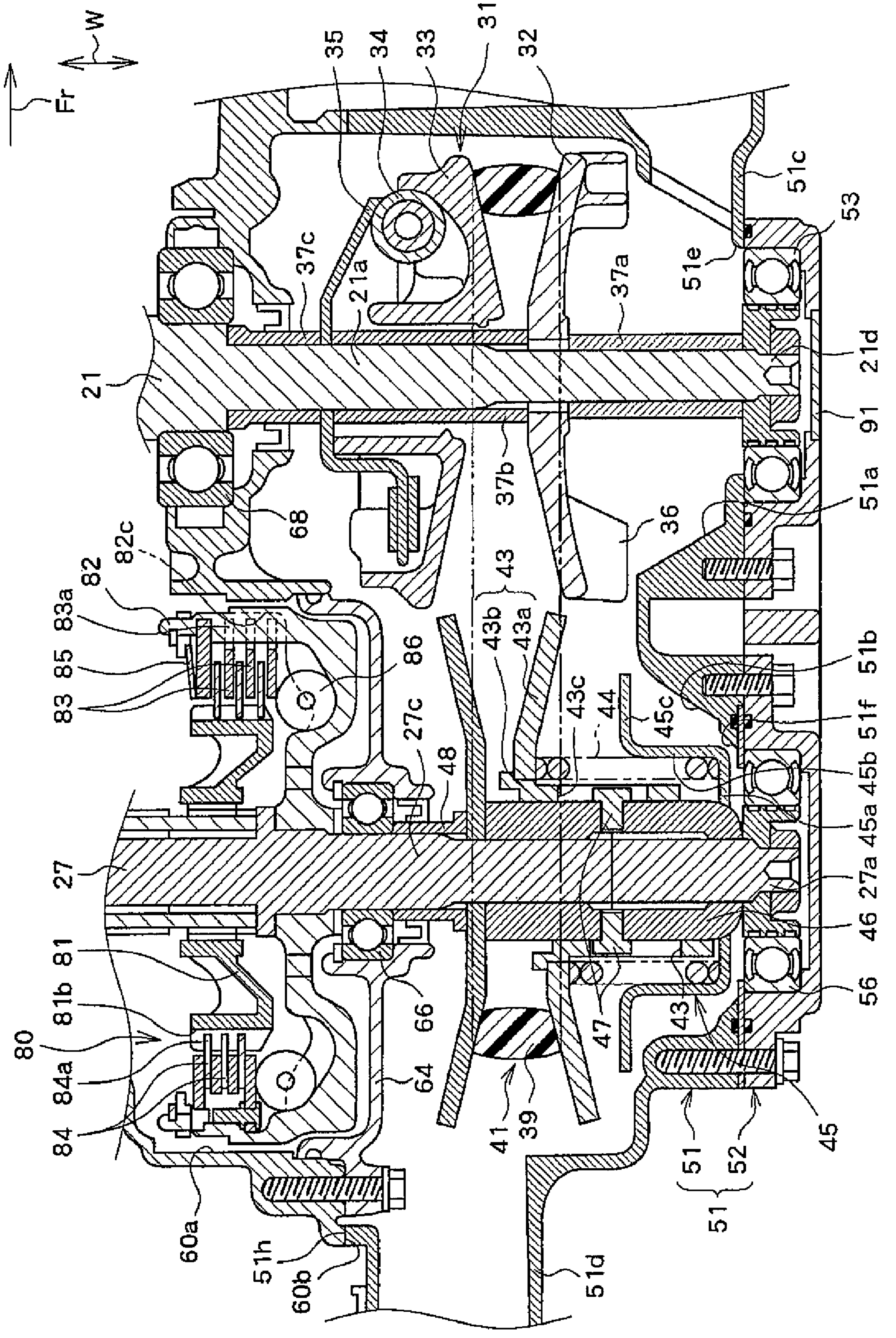
FIG. 4 is a sectional view of a continuously variable transmission and a clutch that are included by the engine unit.

FIG. 4 is a sectional view of continuously variable transmission 30 and clutch 80. As described above, driving side pulley 31 is mounted on right shaft part 21*a* of crankshaft 21. Driving side pulley 31 includes a fixed sheave 32, a movable sheave 33, and a plate 35. Fixed sheave 32 and plate 35 have their axial movement restricted, and movable sheave 33 has its axial movement allowed between fixed sheave 32 and plate 35. Movable sheave 33 is opposite to fixed sheave 32 in the axial direction, and the front side of belt 39 is looped around these parts.

A weight roller 34 moved in the radial direction by centrifugal force is arranged between movable sheave 33 and plate 35. When crankshaft 21 is rotated, weight roller 34 is moved outside in the radial direction and presses movable sheave 33 to the fixed sheave 32 side. Then, belt 39 is pushed and moved forward by moveable sheave 33, whereby the diameter of a portion of driving side pulley 31 around which belt 39 is looped is enlarged to reduce a speed reduction ratio.

Right shaft part 21*a* has collars 37*a*, 37*b*, and 37*c* fitted thereon. End portion 21*d* of right shaft part 21*a* has an annular member 54 and a nut 55 fitted thereon from outside collar 37*a*, annular member 54 and nut 55 being described later. Axial movements of collars 37*a*, 37*b*, and 37*c* are thereby restricted, and axial movements of fixed sheave 32 sandwiched by collar 37*a* and collar 37*b* and plate 35 sandwiched by collar 37*b* and collar 37*c* are also restricted.

Moreover, driving side pulley 31 includes a fan 36 for introducing outside air into transmission case 50. As shown in FIG. 4, fan 36 is erected outward in the vehicle width direction (direction W in FIG. 4) from fixed sheave 32. When fan 36 is rotated with fixed sheave 32, outside air is introduced from an air intake duct 71, and air in transmission case 50 is sent to the driven side pulley 41 side and is exhausted from an air exhaust duct 74 (FIG. 2).

Driven side pulley 41 is mounted on driven shaft 27 and is rotated with driven shaft 27 by torque transmitted via belt 39. Driven side pulley 41 includes a fixed sheave 42 whose axial movement is restricted, a movable sheave 43 movable in the axial direction, and a collar 46 for restricting axial movement of fixed sheave 42. Driven shaft 27 has a collar 48, fixed sheave 42, and collar 46 fitted thereon in this order. These parts are sandwiched by bearing 66 and an annular member 57 and a nut 59 that will be described later, thereby having their axial movements restricted. Collar 46 and fixed sheave 42 are coupled to driven shaft 27 by a spline, and these parts are integrally rotated.

A spring supporting member 45 that is rotated with collar 46 and that is formed in the shape of a disk is fitted on the end portion outside in the vehicle width direction of collar 46. Spring supporting member 45 includes an inner peripheral portion 45*a*, a cylindrical portion 45*b* erected in the axial direction from the edge of inner peripheral portion 45*a* and an outer peripheral portion 45*c* extended in the radial direction from the edge of cylindrical portion 45*b*.

Movable sheave 43 includes a sheave body 43*a* extended in the radial direction of driven shaft 27 and a cylindrical boss part 43*b* fitted on collar 46. Boss part 43*b* has a spring 44 fitted thereon that biases movable sheave 43 to the fixed sheave 42 side. Spring 44 is pressed onto fixed sheave 42 side by inner peripheral portion 45*a* of spring supporting member 45.

Boss part 43*b* has guide grooves 43*c*, 43*c* formed therein that are extended in the axial direction. A key 47 having its tip portion inserted into collar 46 is arranged inside guide grooves 43*c*, 43*c*. Rotation of movable sheave 43 is thereby transmitted to collar 46 via key 47, and movable sheave 43 is guided and moved in the axial direction by key 47.

The rear side of belt 39 is looped around sheave body 43*a* of movable sheave 43 and fixed sheave 42. When movable sheave 33 pushes forward belt 39 in driving side pulley 31, movable sheave 43 is moved in driven side pulley 41 in a direction separate from fixed sheave 42 against the biasing force of spring 44. The diameter of a portion of driven side pulley 41 around which belt 39 is looped thereby becomes smaller and hence a speed reduction ratio becomes larger.

Clutch 80 transmits or interrupts torque transmitted from driven shaft 27 to the downstream side of the driving force transmission path (to the rear wheel 4 side). Clutch 80 includes a clutch outer 82 rotating with driven shaft 27 and a clutch inner 81 idling with respect to driven shaft 27. Clutch 80 is a multiple disk clutch and includes plural disk-shaped friction plates 83 and plural clutch plates 84 that surround clutch inner 81, inside clutch outer 82. An idling gear 26 idling with respect to driven shaft 27 is mounted on driven shaft 27, and clutch inner 81 is rotated with a gear 26.

Each friction plate 83 has a protrusion 83*a* protruding in the radial direction formed on its outer peripheral edge. Protrusion 83*a* is fitted in guide groove 82*c* that is formed in clutch outer 82 and is extended in the axial direction. Friction plates 83 can thereby be moved in the axial direction and can be rotated around driven shaft 27 along with clutch outer 82. The inner peripheral surface of clutch inner 81 is engaged with gear 26. Each clutch plate 84 has a protrusion 84*a* protruding inside in the radial direction formed on its peripheral edge. Protrusion 84*a* is fitted in a guide groove 81*b* that is formed in the outer peripheral surface of clutch inner 81 and that is extended in the axial direction. Clutch plate 84 can thereby be moved in the axial direction and can be rotated with clutch inner 81.

Friction plates 83 and clutch plates 84 are alternately arranged and are pressed onto each other and are moved in association with each other, whereby torque is transmitted from friction plates 83 to clutch plates 84. In the example shown in FIG. 4, clutch 80 is an automatic clutch, and the connection or interruption of clutch 80 is automatically performed according to the rotation speed of driven shaft 27. Specifically, clutch 80 includes a weight roller 86 that rotates around driven shaft 27 with clutch outer 82, and a diaphragm spring 85 that biases friction plates 83 in the axial direction. Friction plates 83 and clutch plates 84 are arranged between weight roller 86 and diaphragm spring 85. When clutch outer 82 is rotated, weight roller 86 is moved in the radial direction by centrifugal force to press friction plates 83 onto clutch plates 84. Clutch 80 is thereby bought into a connection state. Moreover, when the rotation speed of driven shaft 27 is decreased, weight roller 86 is returned inside in the radial direction (to the driven shaft 27 side) and hence friction plates 83 are separated from clutch plates 84, whereby clutch plate 80 is brought into an interruption state.

Rotation of crankshaft 21 is reduced by continuously variable transmission 30 and is transmitted to driven shaft 27. When clutch 80 is in a connection state, rotation of driven shaft 27 is transmitted to gear 26 capable of idling with respect to driven shaft 27 via clutch 80. Gear 26, as shown in FIG. 3, is engaged with a gear 28*a* of an intermediate shaft 28 arranged forward of driven shaft 27. Moreover, intermediate shaft 28 has a gear 28*b* formed thereon that is engaged with a gear 29*b* formed on output shaft 29. Rotation of gear 26 is thereby transmitted to output shaft 29 via intermediate shaft 28. A sprocket 29*c* having a chain looped thereon is mounted on output shaft 29. The chain is looped also on a sprocket rotating with rear wheel 4. Rotation of output shaft 29 is thus transmitted to rear wheel 4 via the chain.

Figure 5:
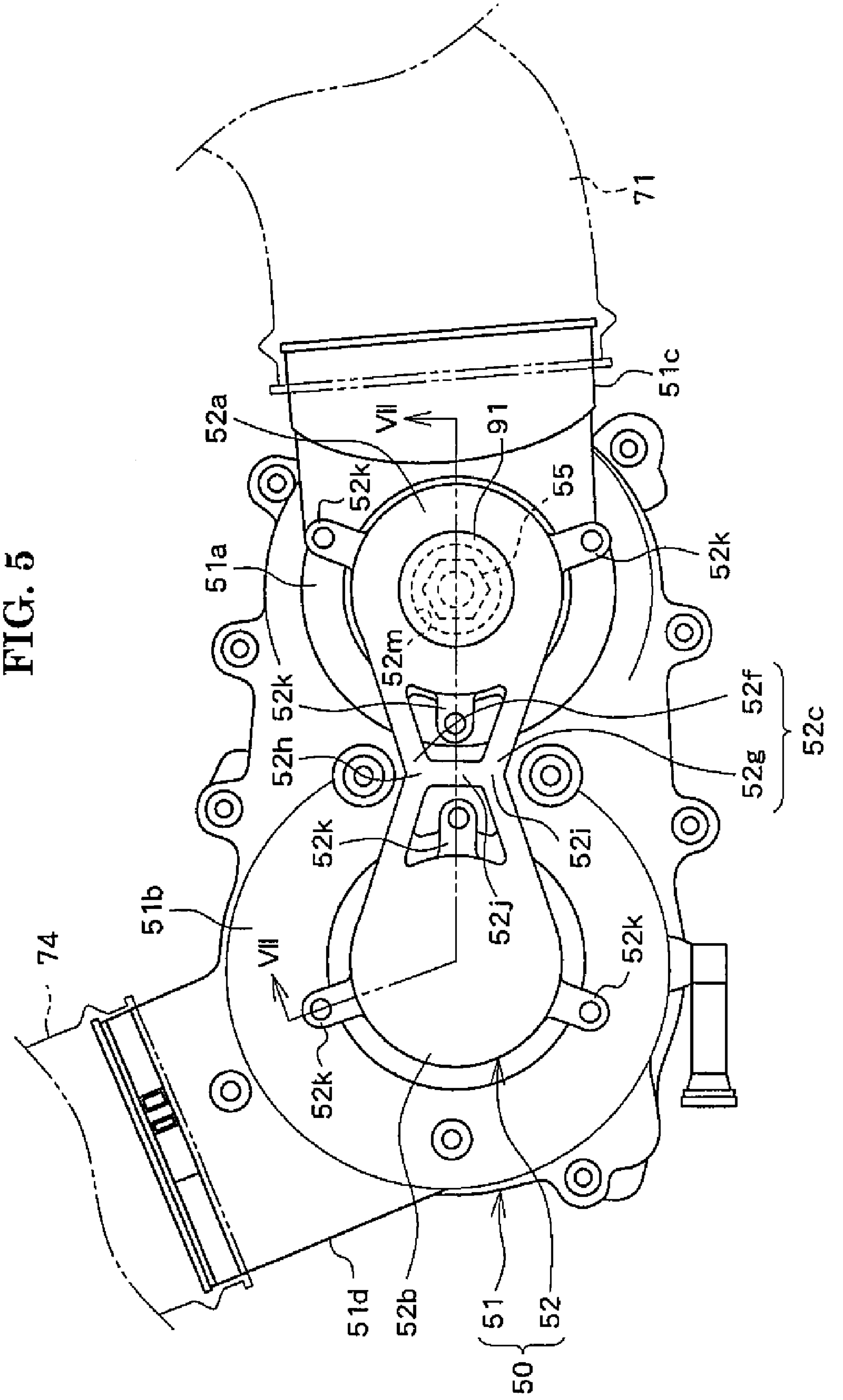
FIG. 5 is a side view of the transmission case.
Figure 6:
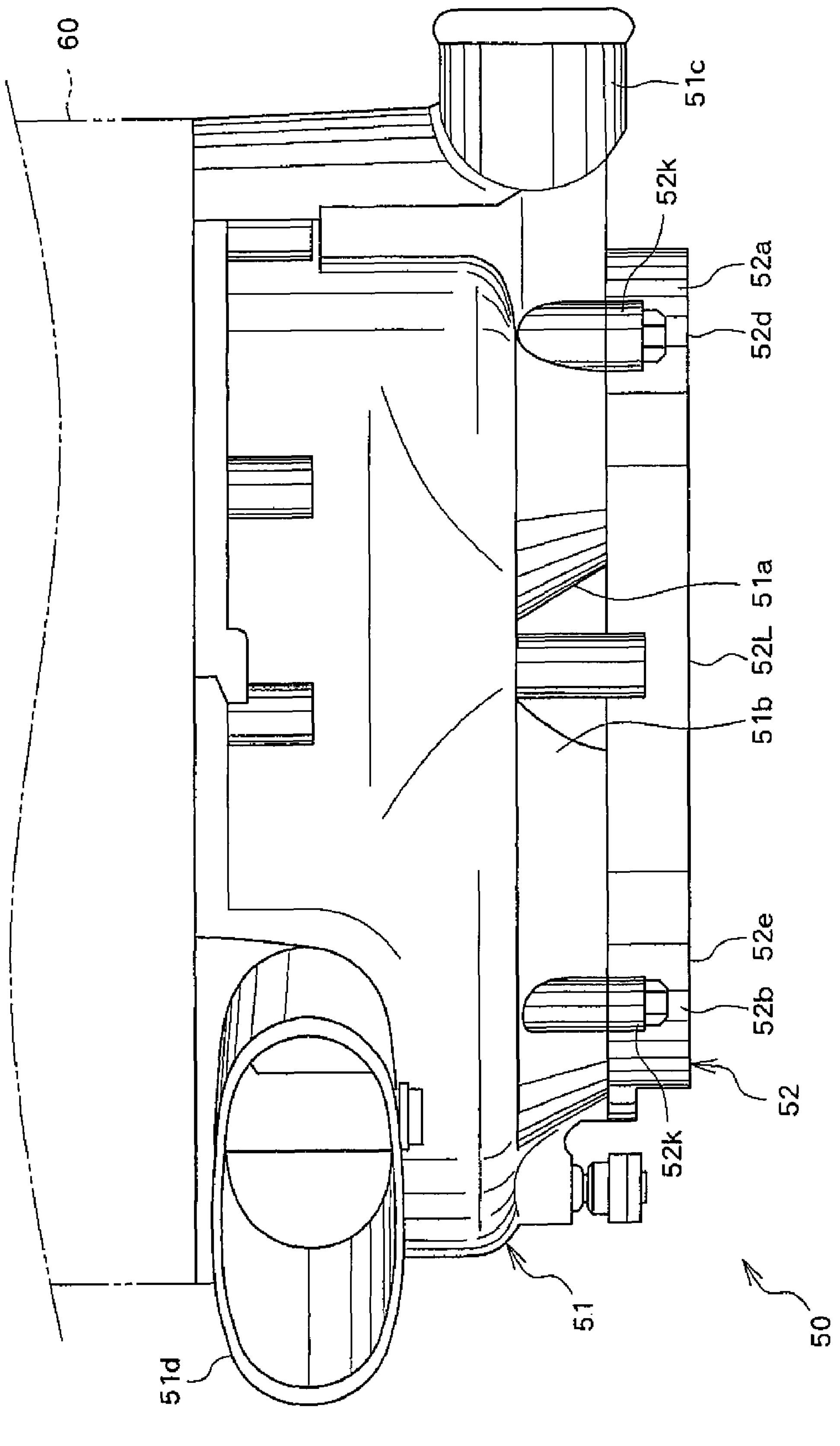
FIG. 6 is a plan view of the transmission case.

Transmission case 50 is now described in detail. FIG. 5 is a side view of and FIG. 6 is a plan view of transmission case 50. Transmission case 50, as shown in FIG. 4, has a case body 51 and a support member 52 housed therein. Case body 51 houses continuously variable transmission 30. Support member 52 is fixed to case body 51 and supporting end portion 21*d* of crankshaft 21 and end portion 27*a* of driven shaft 27.

Case body 51 is formed in the shape of a cup opening inside in the vehicle width direction (to the center portion side in the vehicle width direction. Edge 51*h* of case body 51 is fixed to edge 60*b* outside in the vehicle width direction of crankcase 60. Driving side pulley 31 is arranged inside the front portion of case body 51, and driven side pulley 41 is arranged inside the rear portion thereof As shown in FIGS. 4 and 6, case body 51 has bulging portions 51*a*, 51*b* bulging outward in the vehicle width direction formed in its front portion and in its rear portion. Case body 51 also includes an air intake port 51*c* for taking in outside air and an air exhaust port 51*d* for exhausting air in transmission case 50.

As shown in FIGS. 3 and 5, air intake port 51*c* protrudes forward from bulging portion 51*a*. Air intake port 51*c* has an air intake duct 71 connected thereto that slants upward and has an air cleaner 72 fixed to its tip portion (FIG. 2). Air cleaner 72 has a tip duct 73 fixed to its top portion that protrudes upward. Outside air taken in from tip duct 73 by rotation of a fan 36 formed on driving side pulley 31 is cleaned by air cleaner 72 and then is passed through air intake duct 71 and is sent into transmission case 50.

As shown in FIG. 5, air exhaust port 51*d* is formed so as to protrude slantwise upward from the rear portion of case body 51. As shown in FIG. 2, exhaust port 51*d* has an exhaust duct 74 connected thereto. Air in transmission case 50 is pushed out by rotation of fan 36 and is through air exhaust duct 74 and is exhausted under storage case 8.

As shown in FIG. 4, an opening 51*e* for exposing end portion 21*d* of crankshaft 21 in the axial direction is formed in the wall of bulging portion 51*a*. End portion 21*d* and a bearing 53 for rotatably supporting end portion 21*d* are positioned outside opening 51*e* and are supported by support member 52. An opening 51*f* for exposing end portion 27*a* of driven shaft 27 in the axial direction is formed in the wall of bulging portion 51*b*. End portion 27*a* and a bearing 56 for rotatably supporting end portion 27*a* are positioned outside opening 51*f* and are supported by support member 52. Spring supporting member 45 of driven side pulley 41 is positioned inside bulging portion 51*b*.

Figure 7:
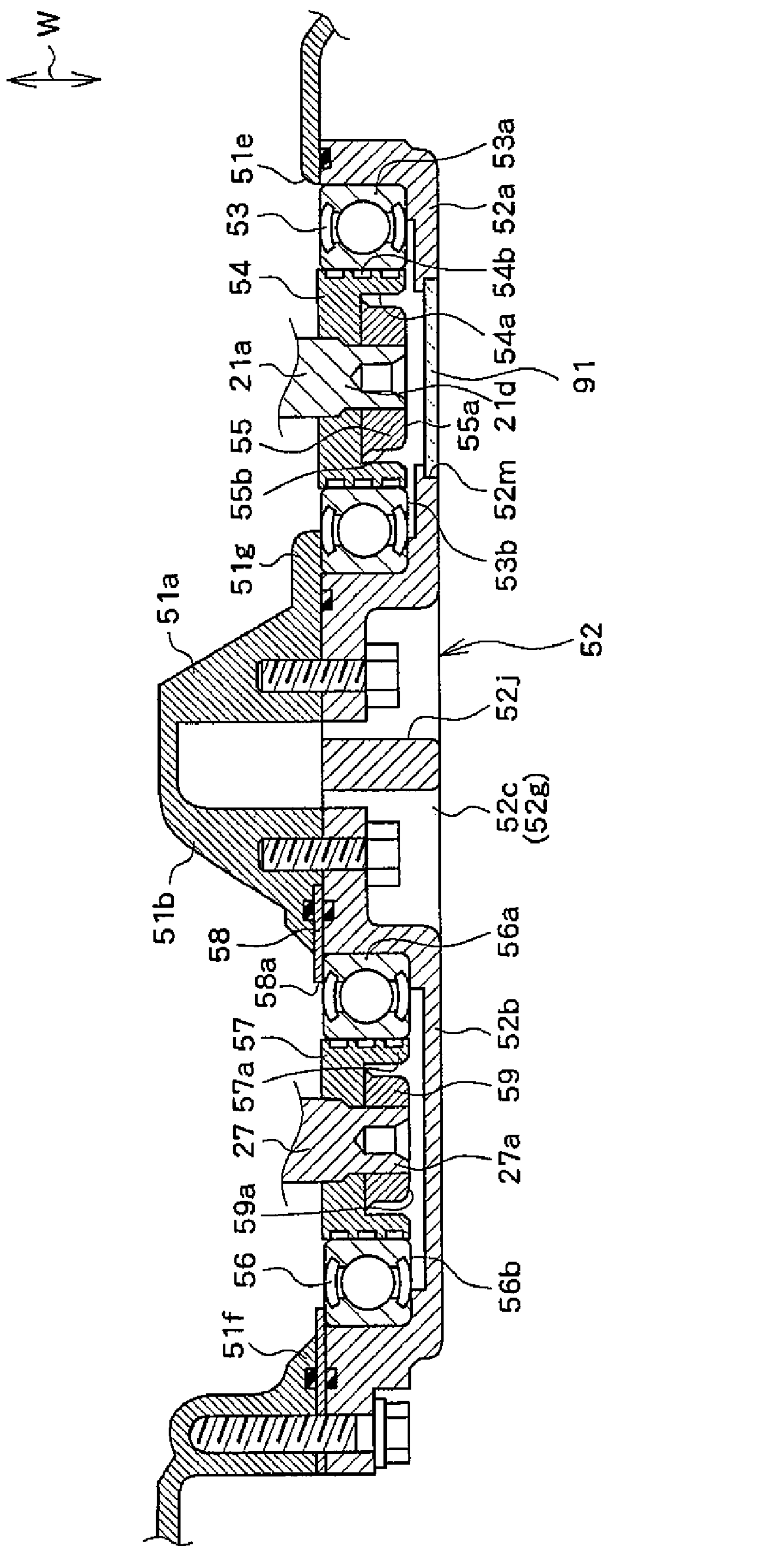
FIG. 7 is a sectional view taken along line VII-VII of FIG. 5.

FIG. 7 is a sectional view taken along line VII-VII in FIG. 5. As shown in FIGS. 5 and 7, support member 52 is long in the front-and-rear direction of the vehicle body and has a drive shaft supporting portion 52*a* formed in its front portion and has a driven shaft supporting portion 52*b* formed in its rear portion. Support member 52 also has a support column portion 52*c* that is bridged and thrust between drive shaft supporting portion 52*a* and driven shaft supporting portion 52*b*.

Support member 52 is fixed to case body 51 from outside in the vehicle width direction to close openings 51*e*, 51*f* of case body 51. As shown in FIG. 6, support member 52 has plural (six) fixing portions 52*k* formed thereon that protrude in the radial direction (direction perpendicular to the center line of crankshaft 21 and to the center line of driven shaft 27) from drive shaft supporting portion 52*a* and driven shaft supporting portion 52*b*. Fixing portions 52*k* are fixed to the outside wall of case body 51 with bolts, for example.

Drive shaft supporting portion 52*a* rotatably supports end portion 21*d* of crankshaft 21. As shown in FIG. 7, drive shaft supporting portion 52*a* has a circular depressed portion formed inside and has bearing 53 fitted in the depressed portion. An annular member 54 formed in the shape of a circular ring and rotated with the inner race of bearing 53 is arranged inside the inner race of bearing 53. Annular member 54 is fitted on end portion 21*d* of crankshaft 21 and is rotated with crankshaft 21. Drive shaft supporting portion 52*a* thereby supports end portion 21*d* of crankshaft 21 via bearing 53 and annular member 54.

As shown in FIG. 4, drive shaft supporting portion 52*a* is fixed to the outside wall of bulging portion 51*a* of case body 51 and is separated in the axial direction from fan 36 formed on fixed sheave 32. Air intake port 51*c* is positioned between fan 36 and drive shaft supporting portion 52*a* in the vehicle width direction.

Figure 8:
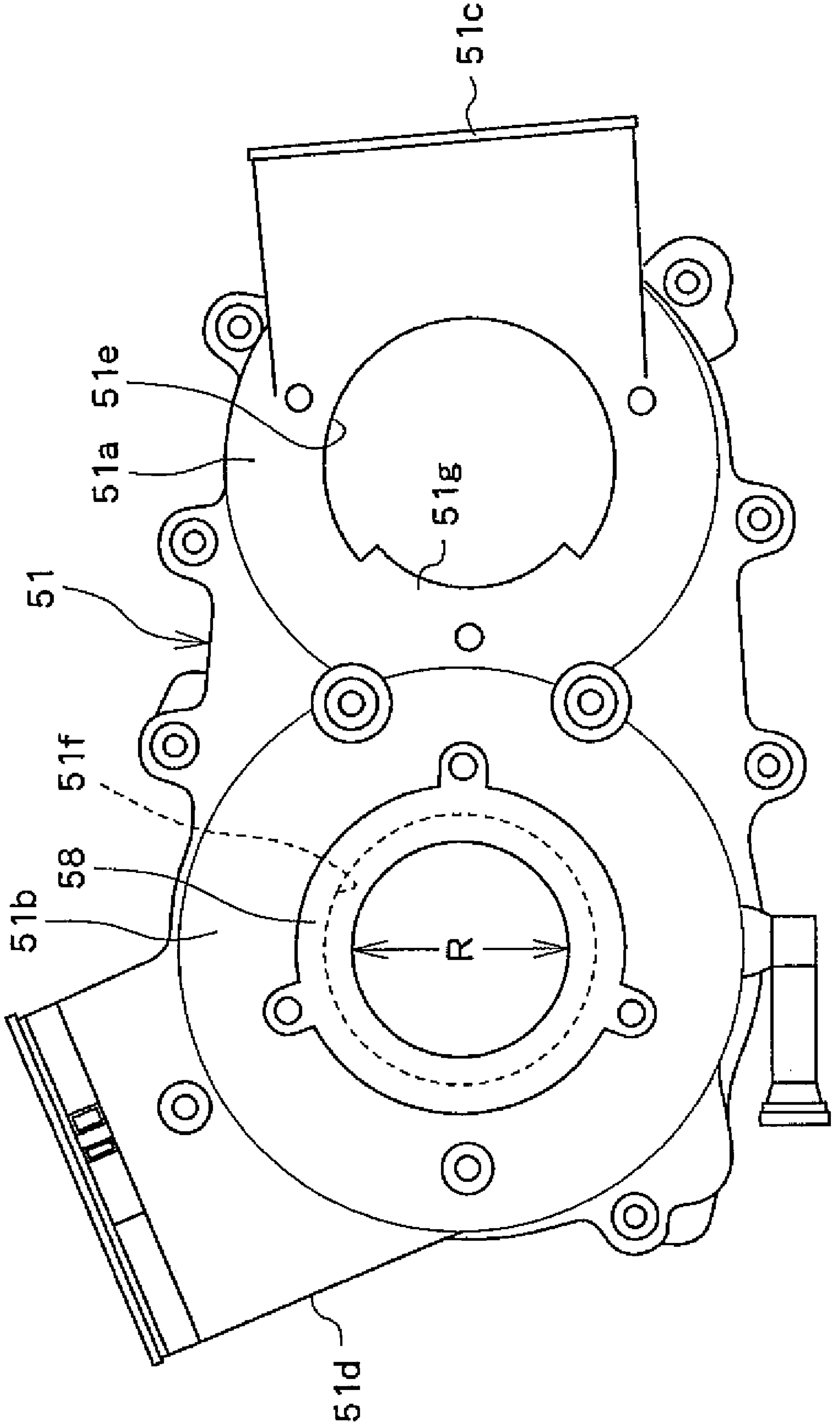
FIG. 8 is a side view of a case body of the transmission case.

A come-off preventing portion 51*g* for preventing bearing 53 from coming off inside in the vehicle width direction is formed on the edge of opening 51*e* of case body 51 shown in FIG. 7. FIG. 8 is a side view of case body 51. As shown in FIGS. 8 and 7, come-off preventing portion 51*g* protrudes inside (on the central side of the opening) from the edge of opening 51*e* and sandwiches outer race 53*a* of bearing 53 between itself and drive shaft supporting portion 52*a*. Come-off preventing portion 51*g* is formed by protruding a portion of the edge of opening 51*e* inside. However, the inside diameter of opening 51*e* may be made smaller than the outside diameter of bearing 53 to make the edge of opening 51*e* a come-off preventing portion.

As shown in FIG. 7, annular member 54 has a depressed portion 54*a* formed therein that is depressed in the axial direction of crankshaft 21. Crankshaft 21 has a nut 55 fitted on its end portion 21*d* from outside annular member 54. Nut 55 is housed axially in depressed portion 54*a* of annular member 54. End surface 55*a* of nut 55 is thereby positioned on the same plane as end surface 53*b* of bearing 53. An oil groove 54*b* elongated in a peripheral direction is formed on the outer peripheral surface of annular member 54. Oil is poured into oil groove 54*b* to lubricate the outer peripheral surface of annular member 54 and the inner peripheral surface of bearing 53.

As shown in FIGS. 5 and 7, a circular opening 52*m* for exposing end portion 21*d* of crankshaft 21 and nut 55 in the axial direction is formed in the outside wall outside in the vehicle width direction of drive shaft supporting portion 52*a*. A cover 91 likewise having circular form is fitted on the edge of opening 52*m* to close opening 52*m*. Cover 91 can be removed, and when cover 91 is removed, end portion 21*d* of crankshaft 21 and nut 55 are exposed. For example, when the operation of positioning piston 23 at a top dead center is performed, a tool for holding end portion 21*d* of crankshaft 21 and nut 55 and for rotating crankshaft 21 can be inserted from opening 52*m*. As shown in FIG. 7, there is a clearance between outer peripheral surface 55*b* of nut 55 and the inner peripheral surface of depressed portion 54*a* of annular member 54 surrounding outer peripheral surface 55*b*.

Driven shaft supporting portion 52*b* is positioned in a direction of extension of belt 39 (rearward) with respect to drive shaft supporting portion 52*a*. Driven shaft supporting portion 52*b* rotatably supports end portion 27*a* of driven shaft 27. Specifically, as shown in FIG. 7, a circular depressed portion is formed also inside driven shaft supporting portion 52*b*, as is the case with drive shaft supporting portion 52*a*, and bearing 56 is fitted in the depressed portion. An annular member 57 rotated with the inner race of bearing 56 and formed in the shape of a circular ring is arranged inside the inner race of bearing 56. Annular member 57 is fitted on end portion 27*a* of driven shaft 27 and is rotated with driven shaft 27. Driven shaft supporting portion 52*b* thereby supports end portion 27*a* of driven shaft 27 via bearing 56 and annular member 57.

Annular member 58 that is formed in the shape of a circular ring and that prevents bearing 56 from coming off inside in the vehicle width direction is fixed to the edge of opening 51*f* of case body 51. Inside diameter R of annular member 58, as shown in FIG. 8, is smaller than the outside diameter of bearing 56 (FIG. 7). Annular member 58 has a come-off preventing part 58*a* formed on its inner periphery that sandwiches outer race 56*a* of bearing 56 between itself and driven shaft supporting portion 52*b*. Annular member 58 is arranged between the edge of opening 51*f* of case body 51 and driven shaft supporting portion 52*b* and is fixed to the edge of opening 51*f* with bolts, for example.

Annular member 57 has a depressed portion 57*a* formed therein that is depressed in the axial direction of driven shaft 27. Driven shaft 27 has a nut 59 fitted on its end portion 27*a* from outside annular member 57. Nut 59 is housed axially in depressed portion 57*a* of annular member 57. End surface 59*a* of nut 59 is thereby positioned on the same plane as end surface 56*b* of bearing 56. As shown in FIG. 6, side surface 52*d* outside in the vehicle width direction of drive shaft supporting portion 52*a* is flush with side surface 52*e* outside in the vehicle width direction of driven shaft supporting portion 52*b*. Side surface 52L of support column portion 52*c* is flush with side surface 52*d* and side surface 52*e*.

As described above, support member 52 has support column portion 52*c* bridged between drive shaft supporting portion 52*a* and driven shaft supporting portion 52*b*. As shown in FIG. 7, support column portion 52*c* is positioned between bearing 53 and bearing 56. As shown in FIG. 5, support column portion 52*c* has an upper support column portion 52*f* and lower support column portion 52*g*. Upper support column portion 52*f* and lower support column portion 52*g* are formed such that the distance between the two portions is the smallest at their central portions 52*h*, 52*i*. Central portions 52*h*, 52*i* are connected to each other by a reinforcing part 52*j* extended in the up-and-down direction.

Support column portion 52*c* is not limited to one including upper support column portion 52*f* and lower support column portion 52*g* but, for example, may be extended from the drive shaft supporting portion 52*a* side to the driven shaft supporting portion 52*b* side on a plane including the center line of crankshaft 21 and the center line of driven shaft 27.

As described above, the front side of belt 39 is wound around driving side pulley 31 and the rear side of belt 39 is wound around driven side pulley 41. For this reason, when belt 39 is tightly looped around the two pulleys to decease transmission loss, there is the possibility that the force of deflecting right shaft part 21*a* of crankshaft 21 and driven shaft 27 will be applied to them. In engine unit 10, support column portion 52*c* is formed between drive shaft supporting portion 52*a* and driven shaft supporting portion 52*b*. Thus, this can increase the strength of supporting crankshaft 21 and driven shaft 27 to prevent these shafts from being deflected.

Transmission case 50 includes support member 52 having drive shaft supporting portion 52*a*, driven shaft supporting portion 52*b*, and support column portion 52*c*; and case body 51 that houses continuously variable transmission 30 and that has support member 52 fixed thereto. In engine unit 10, support member 52 is separate from case body 51, so that, for example, when a material having higher rigidity than the material of case body 51 is used as the material of support member 52, the strength of supporting the shaft is increased. Moreover, when case body 51 is fixed to crankcase 60 and then support member 52 is fixed to case body 51 in such a way that bearing 53 and bearing 56 are fitted in drive shaft supporting portion 52*a* and driven shaft supporting portion 52*b*, the work of assembling the transmission case can be more easily performed as compared with, for example, the case where parts for supporting the end portions of the shafts are integrally molded with the case body.

End portion 21*d* of crankshaft 21 is exposed in the axial direction from opening 51*e* formed in case body 51 and is rotatably supported by bearing 53 arranged outside opening 51*e* in the axial direction. Come-off preventing portion 51*g* for sandwiching bearing 53 between itself and support member 52 is formed on the peripheral edge of opening 51*e*. End portion 27*a* of driven shaft 27 is exposed in the axial direction from opening 51*f* formed in case body 51 and is rotatably supported by bearing 56 arranged outside opening 51*f* in the axial direction. Come-off preventing portion 58*g* for sandwiching bearing 56 between itself and support member 52 is fixed to the peripheral edge of opening 51*f*. Thus, this can prevent bearings 53, 56 from coming off.

Still further, in engine unit 10, come-off preventing portions 51*g* and 58*g* sandwich the outer races of bearings 53, 56, respectively. Thus, crankshaft 21 and driven shaft 27 that are supported by bearings 53, 56 are smoothly rotated. Still further, come-off preventing portion 51*g* protrudes inward of opening 51*e* from the peripheral edge of opening 51*e* of case body 51. Come-off preventing portion 51*g* can thereby be integrally formed with case body 51 and the productivity of engine unit 10 can be increased. Annular member 58 having come-off preventing portion 58*a* is fixed to case body 51, so that case body 51 itself can be easily formed.

Still further, drive shaft supporting portion 52*a* is positioned in a direction of extension of belt 39 with respect to driven shaft supporting portion 52*b*. For this reason, the strengths of supporting crankshaft 21 and driven shaft 27 are increased.

Still further, side surface 52*d* of drive shaft supporting portion 52*a*, side surface 52*e* of driven shaft supporting portion 52*b*, and side surface 52L of support column portion 52*c* are Rush with each other. For this reason, an increase in the vehicle width is prevented as compared with the case where side surface 52*d* and side surface 52*e* are bulged outward in the vehicle width direction and where nuts 55, 59 are covered externally.

Still further, engine unit 10 includes bearing 53 for rotatably holding end portion 21*d* of crankshaft 21, annular member 54 that is arranged inside the inner race of bearing 53 and that is fitted on end portion 21*d* and nut 55 that is fitted on end portion 21*d* from outside annular member 54 in the axial direction. Depressed portion 54*a* depressed in the axial direction is formed on annular member 54, and nut 55 is fitted on end portion 21*d* and is housed in depressed portion 54*a* of annular member 54. Engine unit 10 includes bearing 56 for rotatably holding end portion 27*a* of driven shaft 27, annular member 57 that is arranged inside the inner race of bearing 56 and that is fitted on end portion 27*a* and nut 59 that is fitted on end portion 27*a* from outside annular member 57 in the axial direction. Depressed portion 57*a* depressed in the axial direction is formed on annular member 57 and nut 59 is fitted on end portion 27*a* and is housed in depressed portion 57*a* of annular member 57. With this, crankshaft 21 and driven shaft 27 are made shorter by the amounts of nuts 55, 59 housed in annular members 54, 57 and hence an increase in the vehicle width is prevented.

Still further, transmission case 50 has air intake port 51*c* formed therein that introduces outside air into transmission case 50. Crankshaft 21 has fan 36 formed thereon that is rotated with crankshaft 21 to introduce outside air from air intake port 51*c*. Drive shaft supporting portion 52*a* is arranged separately from fan 36 in the axial direction of crankshaft 21, and air intake port 51*c* is positioned between fan 36 and drive shaft supporting portion 52*a* in the axial direction. For this reason, continuously variable transmission 30 can be cooled by outside air. Further, air intake port 51*c* is positioned between fan 36 and drive shaft supporting portion 52*a*, and hence the flow of air from air intake port 51*c* to fan 36 is not interrupted by drive shaft supporting portion 52*a*. Thus, air intake efficiency of outside air is increased.

Still further, drive shaft supporting portion 52*a* has opening 52*m* formed therein, opening 52*m* exposing end portion 21*d* of crankshaft 21 in the state where drive shaft supporting portion 52*a* supports crankshaft 21. Crankshaft 21 can thereby be rotated in the state where support member 52 supports crankshaft 21, and, for example, the rotational angle of crankshaft 21 with respect to a camshaft for driving a valve for opening or closing the air intake port or the air exhaust port of engine 20 can be adjusted.

Figure 9:
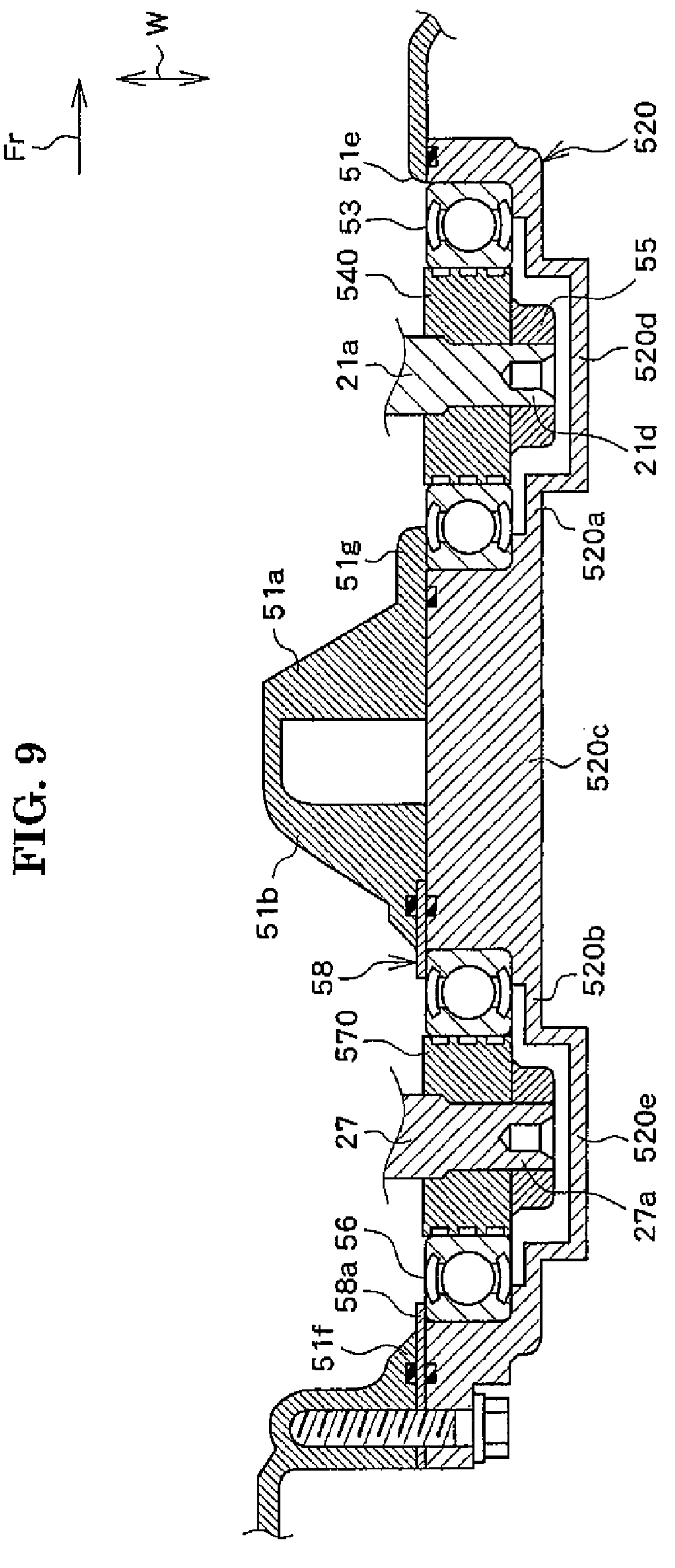
FIG. 9 is a sectional view of a support member of a transmission case in an other embodiment of the present invention.
Figure 10:
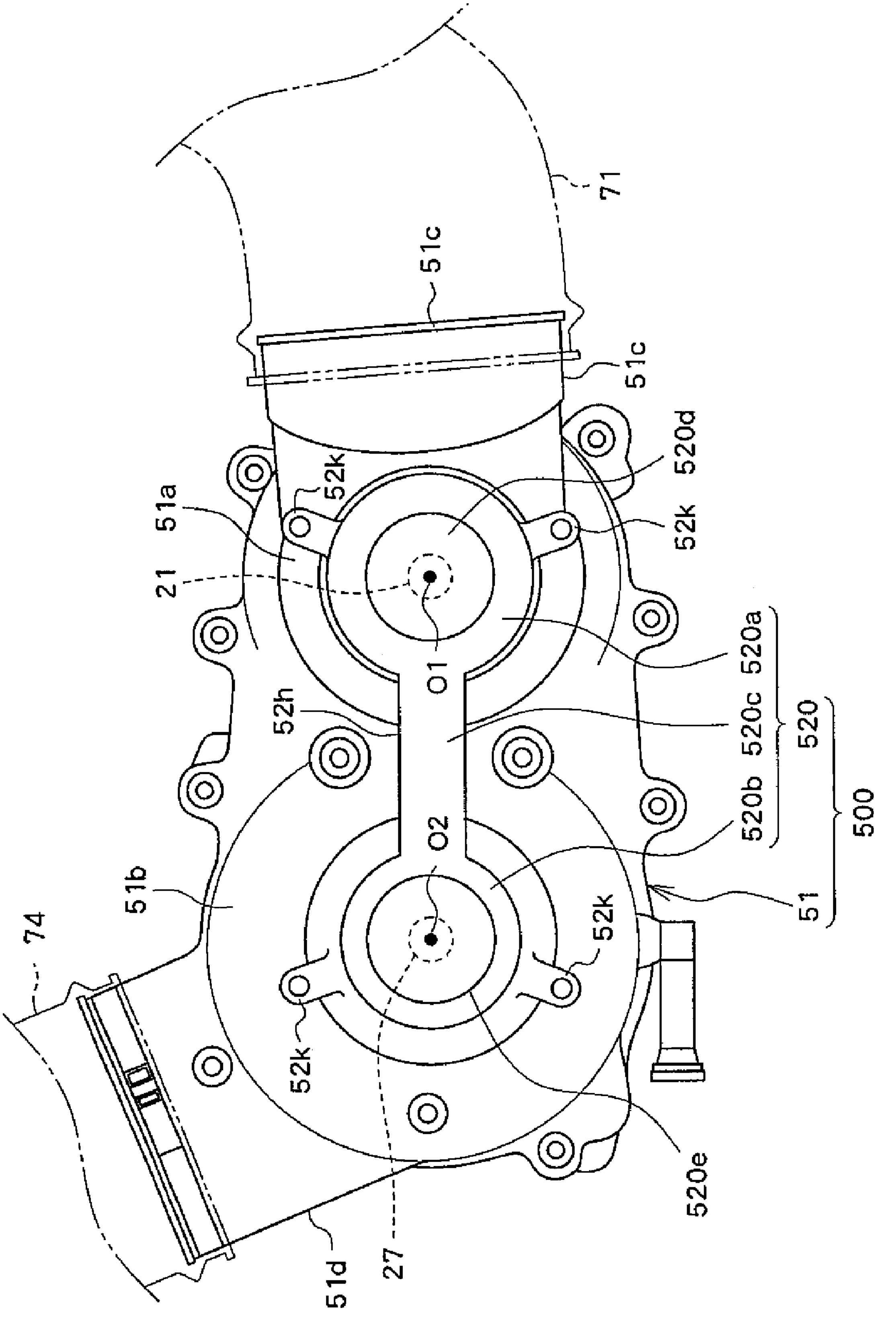
FIG. 10 is a sectional view of the transmission case of the other embodiment of FIG. 9.

In this regard, the present invention is not limited to engine unit 10 described above, but can be variously modified. For example, in the above description, side surface 52L of support column portion 52*c*, side surface 52*d* of drive shaft supporting portion 52*a*, and side surface 52*e* of driven shaft supporting portion 52*b* are flush with each other. However, side surface 52*d* of drive shaft supporting portion 52*a* and side surface 52*e* of driven shaft supporting portion 52*b* may be bulged outward in the vehicle width direction, and end portion 21*d* of crankshaft 21 and end portion 27*a* of driven shaft 27 may be covered externally in the vehicle width direction. FIG. 9 is a sectional view of a support member 520 of an example of this embodiment, and FIG. 10 is a side view of transmission case 500. In these figures, the same parts as those described above are denoted by the same reference numerals.

As shown in FIG. 9, support member 520 includes a drive shaft supporting portion 520*a* and a driven shaft supporting portion 520*b*. Bearing 53 is arranged inside drive shaft supporting portion 520*a*, and an annular member 540 rotated with end portion 21*d* of crankshaft 21 is arranged inside the inner race of bearing 53. Nut 55 is fitted on end portion 21*d* from outside in the vehicle width direction of annular member 540. Central portion 520*d* of the outside wall of drive shaft supporting portion 520*a* bulges outward in the vehicle width direction, and nut 55 is positioned inside central portion 520*d*.

Bearing 56 is arranged inside driven shaft supporting portion 520*b*, and an annular member 570 rotated with end portion 27*a* of driven shaft 27 is arranged inside the inner race of bearing 56. Nut 59 is fitted on end portion 27*a* from outside in the vehicle width direction of annular member 570. Central portion 520*e* of the outside wall of driven shaft supporting portion 520*b* is bulged outward in the vehicle width direction, and nut 59 is positioned inside central portion 520*e*. Here, as in the example of FIG. 9, a support column portion 520*c* is positioned between bearing 53 and bearing 56. Moreover, as shown in FIG. 10, support column portion 520*c* is extended from drive shaft supporting portion 520*a* to driven shaft supporting portion 520*b* on a plane including center line O1 of crankshaft 21 and center line O2 of driven shaft 27.

Still further, in support member 52 described above, side surface 52*d* of drive shaft supporting portion 52*a* and side surface 52*e* of driven shaft supporting portion 52*b* are positioned on the same plane. However, the positional relationship between side surfaces 52*d*, 52*e* is not limited to this, and any one of them may be positioned outside in the vehicle width direction as compared with the other.

Figure 11:
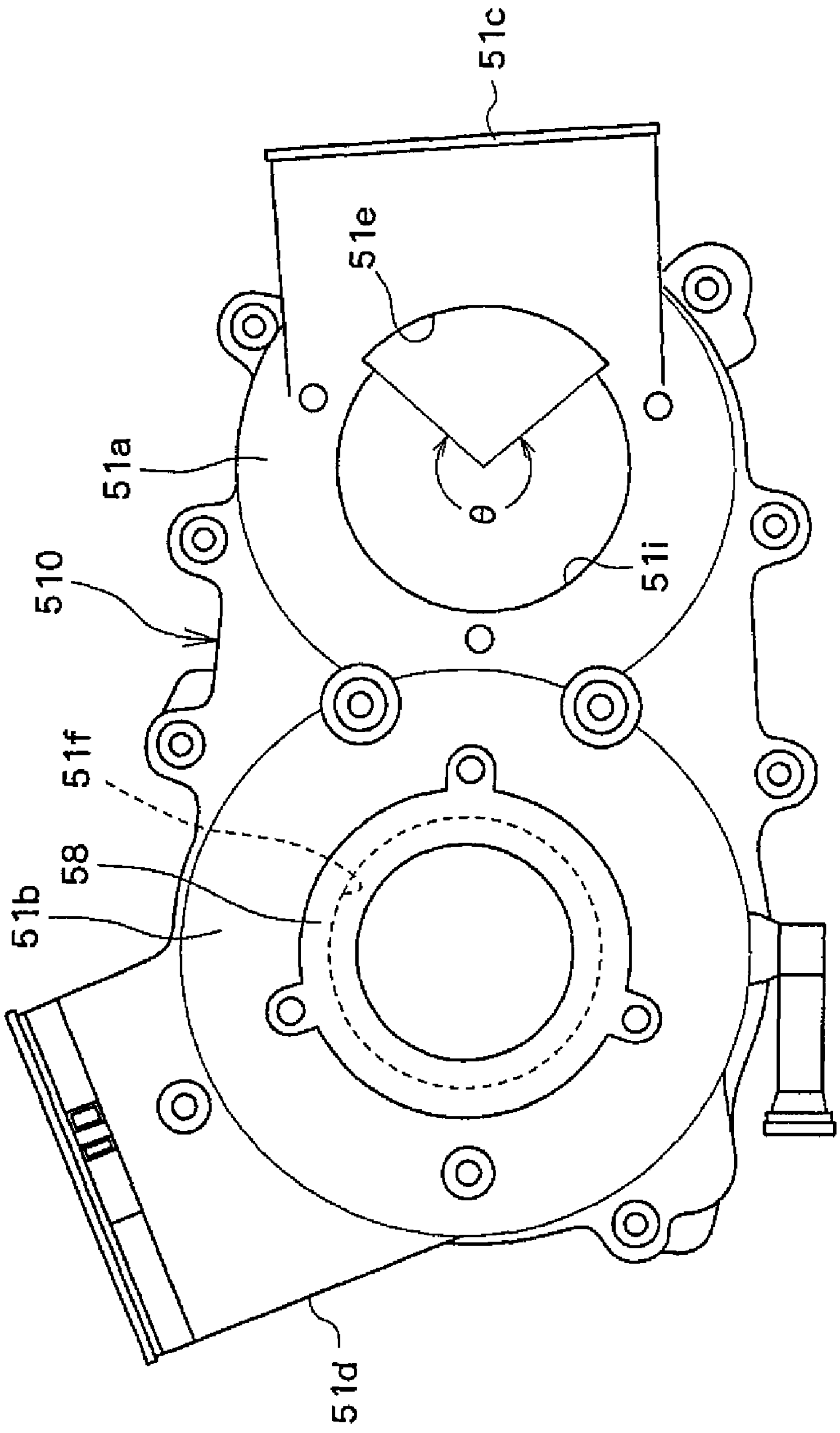
FIG. 11 is a side view of a case body in the other embodiment of the present invention.

Moreover, the come-off preventing portion for regulating movement inside case body 51 of bearing 53 may be formed within a wider angle range than come-off preventing portion 51*g* of FIG. 8. FIG. 11 is a side view of a case body 510 that is an example of an embodiment like this, The same parts in FIG. 11 as those in case body 51 are denoted by the same reference symbols. Opening 51*e* of case body 510 shown in FIG. 11 has a come-off preventing portion 51*i* formed on the edge thereof that is protruded inside. Come-off preventing portion 51*i* is formed, for example, within a range of an angle θ of 180 degrees or more. This more effectively prevents bearing 53 sandwiched between come-off preventing portion 51*i* and support member 52 from rattling. Come-off preventing portion 51*i* is formed at a position opposite to air intake port 51*c* in the edge of opening 51*e*.

Figure 12:
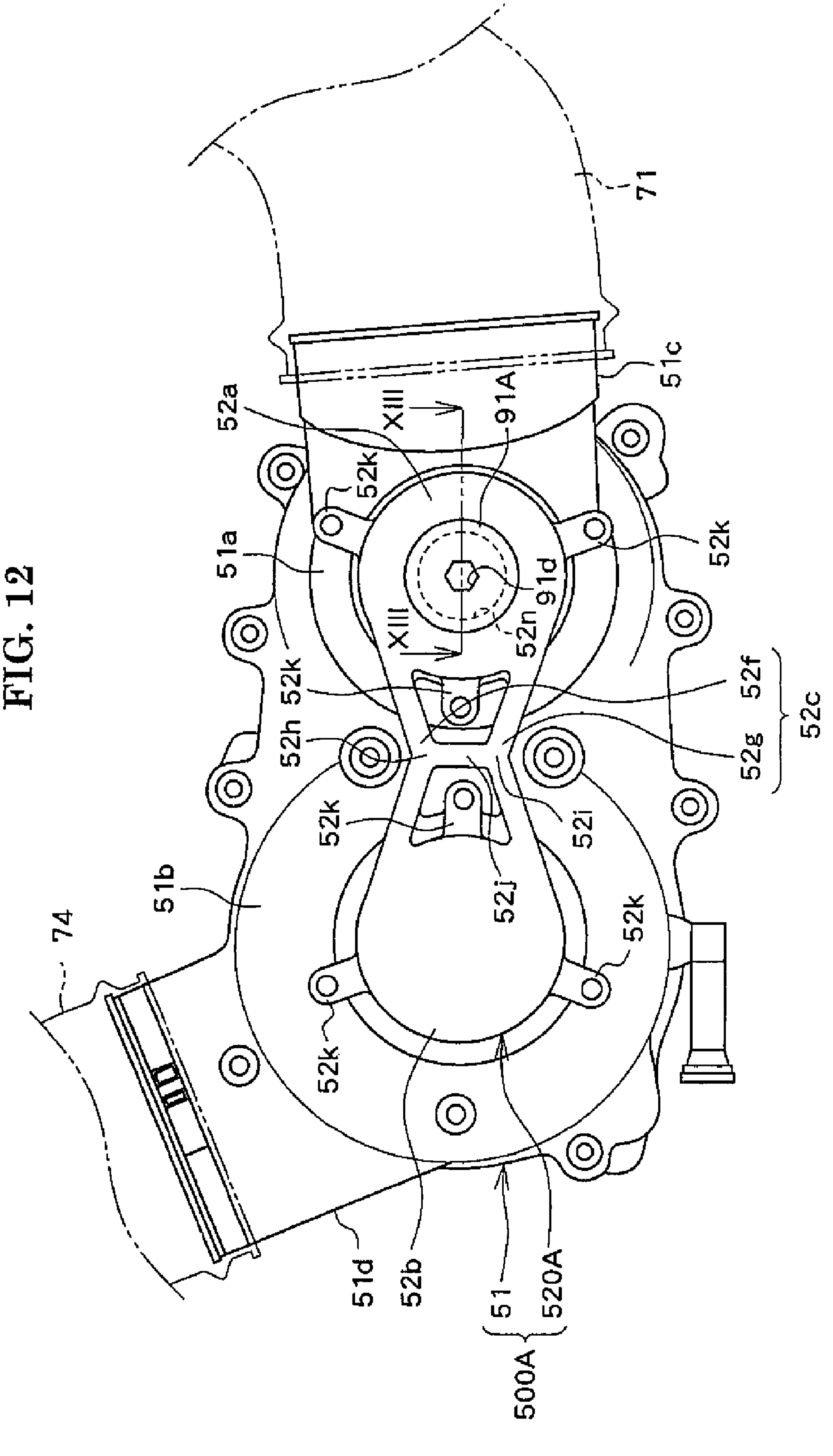
FIG. 12 is a side view of a transmission case in the other embodiment of the present invention.
Figure 13:
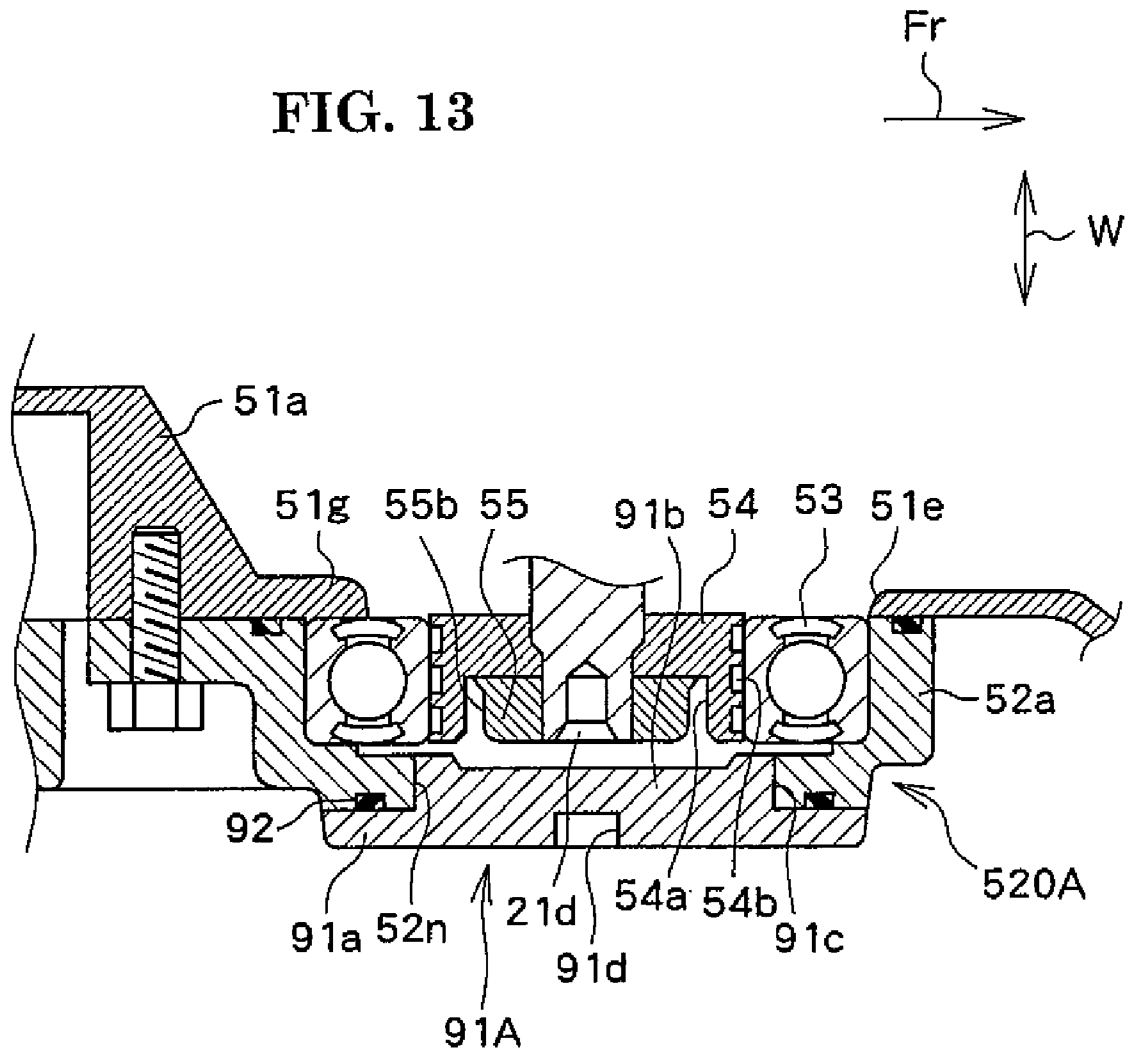
FIG. 13 is a sectional view taken along line XIII-XIII of FIG. 12.

Further, to expose end portion 21*d* of crankshaft 21, opening 52*m* formed in support member 52 may be closed by a cover having an outside diameter larger than opening 52*m*. FIG. 12 is a side view of a transmission case 500A having a cover 91A like this. FIG. 13 is a sectional view taken along line XIII-XIII of FIG. 12. In these drawings, the same parts as those of transmission case 50 described above are denoted by the same reference symbols. An opening 52*n* formed in support member 520A of transmission cased 500A exposes end portion 21*d* of crankshaft 21. Cover 91A has a flange portion 91*a* having an outside diameter larger than opening 52*n* and a fitted portion 91*b* having a diameter nearly equal to the diameter of opening 52*n*. A portion facing flange portion 91*a* at the outer surface of support member 52 has an annular groove with an annular seal member 92 fitted therein that closes a clearance between flange portion 91*a* and the outer surface of support member 52. Fitted portion 91*b* has a thread formed on its outer peripheral surface 91*c*. Opening 52*n* has a thread formed also on its inner peripheral surface. Fitted portion 91*b* is fitted inside opening 52*n* by these threads, whereby cover 91A can be removably mounted on support member 52. Cover 91A has a polygonal hole 91*d* formed in its outer surface. Hole 91*d* has a tool for turning cover 91A fitted therein, for example, when the work of fitting cover 91A in support member 52 is performed.

The invention claimed is:

1. An engine unit comprising:

a drive shaft;

a driven shaft arranged separately from the drive shaft;

a continuously variable transmission including a driving side pulley mounted on the drive shaft, a driven side pulley mounted on the driven shaft, and a belt looped around the driving side pulley and the driven side pulley; and a case arranged to house the continuously variable transmission; wherein the case includes a case body including a first opening;

the case includes a support member including a drive shaft supporting portion arranged to support an end portion of the drive shaft, a driven shaft supporting portion arranged to support an end portion of the driven shaft, and a support column portion bridged between the drive shaft supporting portion and the driven shaft supporting portion; and the support member is attached to an outside of the case body such that the end portion of the drive shaft or the end portion of the driven shaft extends in an axial direction through the first opening to be supported by the drive shaft supporting portion or the driven shaft supporting portion.

2. The engine unit as claimed in claim 1, wherein the support member includes a bearing and the end portion of the drive shaft or the end portion of the driven shaft is rotatably supported by the bearing outside the first opening in the axial direction, the first opening includes a come-off preventing portion provided on at least a portion of a peripheral edge of the first opening and arranged to sandwich the bearing between the come-off preventing portion and the support member.

3. The engine unit as claimed in claim 2, wherein the come-off preventing portion sandwiches an outer race of the bearing.

4. The engine unit as claimed in claim 2, wherein the come-off preventing portion bulges toward an inside of the first opening from the peripheral edge of the first opening of the case body.

5. The engine unit as claimed in claim 2, wherein the come-off preventing portion is fixed to the case body.

6. The engine unit as claimed in claim 1, wherein the drive shaft supporting portion is spaced from the driven shaft supporting portion in a direction of extension of the belt.

7. The engine unit as claimed in claim 1, wherein the drive shaft supporting portion, the driven shaft supporting portion, and the support column portion define side surfaces that are flush with each other in a vehicle width direction.

8. The engine unit as claimed in claim 1, further comprising:

a bearing arranged to rotatably hold the end portion of the drive shaft or the end portion of the driven shaft;

an annular member arranged inside an inner race of the bearing and fitted on the end portion of the drive shaft or the end portion of the driven shaft;

a nut fitted on the end portion of the drive shaft or the end portion of the driven shaft from outside the annular member in the axial direction; wherein the annular member includes a depressed portion depressed in the axial direction; and the nut is fitted on the end portion of the drive shaft or the end portion of the driven shaft and is housed in the depressed portion of the annular member.

9. The engine unit as claimed in claim 1, wherein the case includes an air intake port arranged to introduce outside air into the case; and the drive shaft includes a fan mounted thereon that rotates with the drive shaft and introduces the outside air from the air intake port;

the drive shaft supporting portion is arranged separately from the fan in the axial direction of the drive shaft; and the air intake port is positioned between the fan and the drive shaft supporting portion in the axial direction.

10. The engine unit as claimed in claim 1, wherein the drive shaft is a crankshaft; and the drive shaft supporting portion includes an opening therein, the opening in the drive shaft supporting portion exposing the end portion of the drive shaft in a state where the drive shaft supporting portion supports the end portion of the drive shaft.

11. The engine unit as claimed in claim 10, further comprising a cover that closes the opening in the drive shaft supporting portion and that is removably fitted in the drive shaft supporting portion.

12. A straddle-type vehicle mounted with the engine unit as claimed in claim 1.

13. The engine unit as claimed in claim 1, wherein the case body includes a second opening, the end portion of the drive shaft extends through the first opening and the end portion of the driven shaft extends through the second opening, and the support member includes a first bearing arranged to directly support the end portion of the drive shaft and a second bearing arranged to directly support the end portion of the driven shaft.

* * * * *